US010055486B1

(12) United States Patent
Xu et al.

(10) Patent No.: US 10,055,486 B1
(45) Date of Patent: Aug. 21, 2018

(54) SYSTEM AND METHOD FOR REAL WORLD EVENT SUMMARIZATION WITH MICROBLOG DATA

(71) Applicant: HRL Laboratories, LLC, Malibu, CA (US)

(72) Inventors: Jiejun Xu, Chino, CA (US); Tsai-Ching Lu, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 366 days.

(21) Appl. No.: 14/818,619

(22) Filed: Aug. 5, 2015

Related U.S. Application Data (60) Provisional application No. 62/033,342, filed on Aug. 5, 2014.

(51) Int. Cl.
*G06F 17/30* (2006.01)

(52) U.S. Cl.
CPC .. *G06F 17/30696* (2013.01); *G06F 17/30268* (2013.01); *G06F 17/30958* (2013.01)

(58) Field of Classification Search
USPC ............... 707/687, 705, 790, 738, 821, 946
See application file for complete search history.

(56) References Cited

U.S. PATENT DOCUMENTS

| 9,742,719 | B2* | 8/2017 | Acharya | ................. H04L 51/32 |
| 2011/0173264 | A1* | 7/2011 | Kelly | ..................... G06Q 10/10 709/205 |
| 2013/0246430 | A1* | 9/2013 | Szucs | ................ G06F 17/30011 707/738 |

OTHER PUBLICATIONS

A. Nenkova and K. Mckeown. A survey of text summarization techniques, In C. C. Aggarwal and C. Zhai, editors, Mining Text Data. Springer US, 2012, Chapter 3, pp. 43-76.

B. Shari, M.-A. Hutton, and J. Kalita. Summarizing microblogs automatically, HLT'10, pp. 685-688. Association for Computational Linguistics, 2010.

D. Chakrabarti and K. Punera. Event summarization using tweets. In ICWSM, 2011, pp. 1-8.

X. Yang, A. Ghoting, Y. Ruan, and S. Parthasarathy. A framework for summarizing and analyzing twitter feeds. In KDD, pp. 370-378. ACM, 2012.

L. Kennedy, M. Naaman, S. Ahern, R. Nair, and T. Rattenbury. How Flicker helps us make sense of the world: context and content in community-contributed media collections. In Multimedia '07: Proceedings of the 15th internationalconference on Multimedia, pp. 631-640. ACM, 2007.

L. Cao, J. Luo, A. C. Gallagher, X. Jin, J. Han, and T. S. Huang. A worldwide tourism recommendation system based on geotaggedweb photos. In ICASSP, pp. 2274-2277, 2010.

S. Rudinac, A. Hanjalic, and M. Larson, Finding Representative and diverse community contributed images to create visual summaries of geographic areas. In ACM Multimedia, pp. 1109-1112. ACM, 2011.

(Continued)

*Primary Examiner* — Sana A Al-Hashemi
(74) *Attorney, Agent, or Firm* — Tope-McKay & Associates (57) ABSTRACT

Described is a system for real world event summarization with microblog data. The system collects microblog image posts related to a real world event based on an event tag and generates a heterogeneous network (having nodes and edges) based on the microblog image posts. The nodes are ranked and images are then extracted from top-ranked nodes for display to the user as a real world event summarization.

21 Claims, 6 Drawing Sheets

(56) References Cited

OTHER PUBLICATIONS

T. Hua, T.-C. Lu, N. Ramakrishnan, F. Chen, J. Arredondo, D. Mares, and K. M. Summers. Analyzing Civil unrest through social media. IEEE Computer, 46(12): pp. 80-84, 2013.

J. Xu, T.-C. Lu, R. Compton, and D. Allen. Civil unrest prediction: A Tumblr-based exploration. In SBP, 2014, pp. 1-8.

H. Gao, G. Barbier, and R. Goolsby, Harnessing the crowsourcing power of social media for disaster relief. IEEE Intelleigent Systems, 26(3): pp. 10-14, May 2011.

J. Rogstadius, M. Vukovic, C. Teixeira, V. Kostakos, E. Karapanos, and J. Laredo. Crisitracker: Crowdsourced social media curation for disaster awareness. IBM Journal of Research and Developments, 57(5): pp. 4:1-4:13, Sep. 2013.

E. Aramaki, S. Maskawa, and M. Morita. Twitter catches the flu: Detecting influenza epidemics using twitter, EMNLP '11, pp. 1568-1576, Stroudsburg, PA, USA, 2011.

A. Signorini, A. M. Segre, and P. M. Polgreen, The use of twitter to track levels of disease activity and public concern in the U.S. during the influenza A H1N1 pandemic. PLoS ONE, 6(5):e19467, May 2011, pp. 1-10.

J. Xu, R. Compton, T.-C. Lu, and D. Allen, Rolling through Tumblr: Characterizing behavioral patterns of microblogging platform, In ACM Web Science Conference, 2014, pp. 1-11.

\* cited by examiner

SYSTEM AND METHOD FOR REAL WORLD EVENT SUMMARIZATION WITH MICROBLOG DATA

GOVERNMENT RIGHTS

This invention was made with government support under U.S. Government Contract Number D12PC00285. The government has certain rights in the invention.

CROSS-REFERENCE TO RELATED APPLICATIONS

This is a non-provisional patent application of 62/033,342, filed in Aug. 5, 2014, entitled, "Real-World Event Summarization with Microblog Data", the entirety of which is hereby incorporated by reference.

BACKGROUND OF INVENTION

(1) Field of Invention

The present invention is related to microblog data and, more particularly, extracting important event information from microblog data that may be used to generate an intuitive visual summary of a targeted event.

(2) Description of Related Art

Microblogging platforms such as Twitter® and Tumblr® have emerged as major hubs for information diffusion, through which massive volume of data relating to real-world events are generated and shared on a daily basis. For instance, as of April 2014, Tumblr® has over 100 million new posts per day coming from its 180 million users. Often times, these posts are related-to real-world events. However, the vast number of posts makes it very difficult for users to sort through and get the overall picture of a particular event.

As a result, a large body of research works has been devoted to extracting knowledge of specific events from these platforms. For instance, Hua et al. and Xu et al. proposed novel methods to analyze and forecast civil unrest events using social media data from Twitter® and Tumblr® (see the List of Incorporated Literature References, Literature Reference Nos. 8 and 9).

In other work, Gao et al. and Rogstadius et al. demonstrated the benefits of utilizing social media and microblogging services for disaster monitoring and relief (see Literature Reference Nos. 10 and 11). Other researchers proposed different mechanisms to extract tweets related to influenza-like illness from Twitter® stream for epidemics tracking and prediction (see Literature Reference Nos. 12 and 13). Essentially these works are different forms of crowdsourcing applications in which microblogging users serve as low-level sensors to provide timely information regarding specific events. However, these sensor information are usually massive and inherently noisy. It is very challenging (if not impossible) to obtain a full picture of an event by sifting through individual posts manually.

Most previous summarization literature focused on the written text domain, as driven by the annual evaluation tracks of the DUC (Document Understanding Conference) and TAC (Text Analysis Conference). Nenkova and McKeown have reviewed an extensive survey of text summarization techniques (see Literature Reference No. 1). To some extent, microblog summarization is related to spoken document summarization, since both tasks deal with the conversational text that is contributed by multiple participants and contains lots of ill-formed sentences, colloquial expressions, nonstandard word tokens or high word error rate, etc. A few existing work on microblog summarization can be found in Literature Reference Nos. 2, 3, and 4. However, all such work is text based which again is inherently noisy and does not provide visual imagery.

Thus, a continuing need exists for a system that is operable for extracting important event information from microblog data and generating an intuitive visual summary of a targeted event.

SUMMARY OF INVENTION

Described is a system for real world event summarization with microblog data. The system includes one or more processors and a memory. The memory is for example, a non-transitory computer-readable medium having executable instructions encoded thereon, such that upon execution of the instructions, the one or more processors perform several operations, including collecting microblog image posts related to a real world event based on an event tag; identifying (or generating) nodes and edges of a heterogeneous network based on the microblog image posts; ranking the nodes; and extracting images from top-ranked nodes for real world event summarization. The extracted images are temporally presented to a user as the real world event summarization, with the extracted images depicted on a timeline.

In another aspect, in generating the heterogeneous network, the heterogeneous network is a graph G having post nodes P, tag nodes T, user nodes U, and image nodes I, such that a final set of nodes V in graph G is equal to P U T U U U I, where U denotes a union of different node types.

In yet another aspect, the graph (is generated such that for each N microblog posts related to the event, a post node P is introduced, and wherein a tag node I is added for each Nt tags associated to microblog posts related to the real world event, and wherein a user node U is introduced for each Nu users uploading an image related to the real world event or commenting on another user's posts related to the real world event, and wherein an image node I is added for each of Ni images from the microblog posts related to the real world event.

Additionally and in another aspect, in generating the heterogeneous network, the heterogeneous network is a graph G having nodes and edges, such that the graph G includes temporal edges and three types of attribute edges, including image-post edges, tag-post edges, and user-post edges, and where an adjacency matrix $W_{PI}$, $W_{PT}$, and $W_{PU}$ is used to represent each edge type respectively.

Further, in ranking the nodes, the system employs manifold ranking to rank the nodes and generate a ranked list of candidate images for visual summarization.

In yet another aspect, the one or more processors further perform an operation of diversification by decreasing rankings of one or more nodes to generate a set of nodes with updated ranks.

Finally and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention is related to microblog data and, more particularly, extracting important event information from microblog data that may be used to generate an intuitive visual summary of a targeted event. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Next, specific details of various embodiments of the present invention are provided to give an understanding of the specific aspects. Finally, example experimental results are provided for further understanding.

(1) LIST OF INCORPORATED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number.

1. A. Nenkova and K. McKeown. A survey of text summarization techniques. In C. C. Aggarwal and C. Zhai, editors, Mining Text Data. Springer US, 2012.
2. B. Shari, M.-A. Hutton, and J. Kalita. Summarizing microblogs automatically. HLT '10, pages 685{688. Association for Computational Linguistics, 2010
3. D. Chakrabarti and K. Punera. Event summarization using tweets. In ICWSM, 2011
4. X. Yang, A. Ghoting, Y. Ruan, and S. Parthasarathy. A framework for summarizing and analyzing twitter feeds. In KDD, pages 370{378. ACM, 2012.
5. L. Kennedy, M. Naaman, S. Ahern, R. Nair, and T. Rattenbury. How Flickr helps us make sense of the world: context and content in community-contributed media collections. In MULTIMEDIA '07: Proceedings of the 15th international conference on Multimedia, pages 631-640. ACM, 2007.
6. L. Cao, J. Luo, A. C. Gallagher, X. Jin, J. Han, and T. S. Huang. A worldwide tourism recommendation system based on geotaggedweb photos. In ICASSP, pages 2274-2277, 2010
7. S. Rudinac, A. Hanjalic, and M. Larson. Finding representative and diverse community contributed images to create visual summaries of geographic areas. In ACM Multimedia, pages 1109{1112. ACM, 2011
8. T. Hua, T.-C. Lu, N. Ramakrishnan, F. Chen, J. Arredondo, D. Mares, and K. M. Summers. Analyzing civil unrest through social media. IEEE Computer, 46(12): 80{84, 2013.
9. J. Xu, T.-C. Lu, R. Compton, and D. Allen. Civil unrest prediction: A Tumblr-based exploration. In SBP, 2014.
10. H. Gao, G. Barbier, and R. Goolsby. Harnessing the crowdsourcing power of social media for disaster relief. IEEE Intelligent Systems, 26(3): 10{14, May 2011
11. J. Rogstadius, M. Vukovic, C. Teixeira, V. Kostakos, E. Karapanos, and J. Laredo. Crisistracker: Crowdsourced social media curation for disaster awareness. IBM Journal of Research and Development, 57(5):4:1{4:13, September 2013.
12. E. Aramaki, S. Maskawa, and M. Morita. Twitter catches the flu: Detecting influenza epidemics using twitter. EMNLP '11, pages 1568{1576, Stroudsburg, Pa., USA, 2011.

13. A. Signorini, A. M. Segre, and P. M. Polgreen. The use of twitter to track levels of disease activity and public concern in the U.S. during the influenza A H1N1 pandemic. PLoS ONE, 6(5):e19467, 05 2011.
14. J. Xu, R. Compton, T.-C. Lu, and D. Allen. Rolling through Tumblr: Characterizing behavioral patterns of the microblogging platform. In ACM Web Science Conference, 2014

(2) PRINCIPAL ASPECTS

The present invention has three "principal" aspects. The first is system for real-world event summarization using microblog data. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
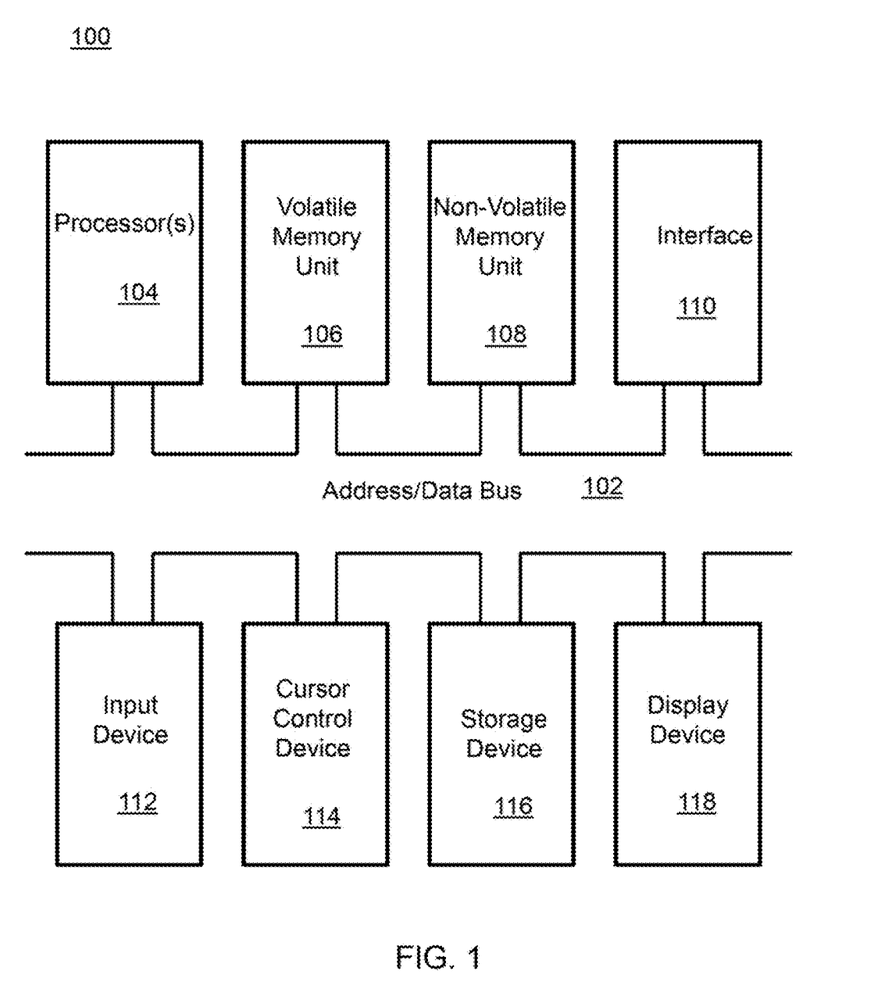
FIG. 1 is a block diagram depicting the components of a system according to an embodiment.

A block diagram depicting an example of a system (i.e., computer system 100) of the present invention is provided in FIG. 1. The computer system 100 is configured to perform calculations, processes, operations, and/or functions associated with a program or algorithm as described herein. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 11I 8 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
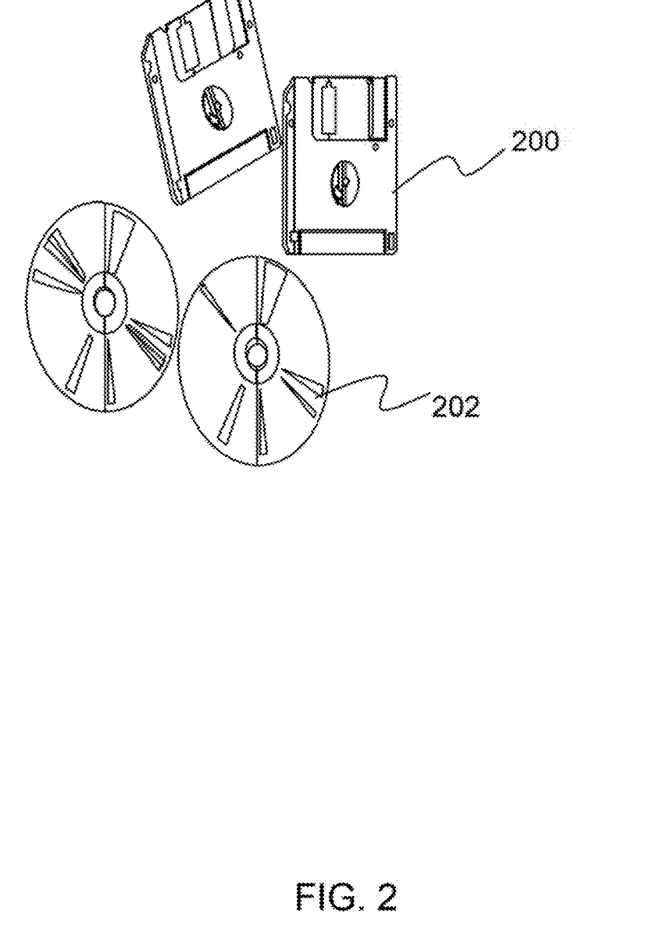
FIG. 2 is an illustration of a computer program product according to an embodiment.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

Microblogging platforms (such as Twitter® and Tumblr®) have emerged as major hubs for information diffusion, through which massive volume of data relating to real-world events are generated and shared on a daily basis. The system described herein provides a process to automatically generate a concise and representative summary of a targeted real-world event by extracting the most relevant information from microblogging platforms. Specifically, the system is directed to visual event summarization, as multimedia contents such as images and videos are becoming prevalent in online platforms. These visual contents provide much vivid descriptions of different events.

The system also incorporates the concept of crowdsourcing. However, instead of explicitly delegating the high-level summarization task to social media users, the system uses an implicit crowdsourcing approach to extract and summarize the most useful information by analyzing the interrelationship among users on a microblogging platform. In other words, the crowdsourcing paradigm is extended by utilizing microblogging users as filters in a collective manner. Although not limited thereto, one suitable example of a microblogging platform that can be utilized is that of Tumblr®. For example, according to the recent study (see Literature Reference No. 14), close to 80% of the Tumblr® posts are image-based. In addition, many posts are related to real-word event as referenced in Literature No. 9. Thus, a microblogging platform with a large number of image provides a suitable platform to study visual event summarization.

To summarize visual events, various embodiments of the system automatically select a set of images to generate a coherent and concise visual summary of an event from online microblogging platforms. Central to the approach for some embodiments is a unified graph with heterogeneous nodes and edges to capture the interrelationship among various entities (e.g., users, posts, images, hash tags) of online social media. With the graph representation, the summarization problem is then recast as a graph-based ranking problem by identifying the most representative images regarding an event. The intuition behind the system is that not only can it crowdsource social media users as sensors to capture and share data, but it also uses them as filters to identify the most useful information through analyzing their interaction in the microblogging network. The graph framework is flexible enough to support different query types, such as finding representative tags or finding influential users. Furthermore, the framework can be expanded to support geographical, temporal and other factors.

For example, the system can be extended to "landmark summarization." In landmark summarization, a goal is to identify a set of canonical images to represent a geographic landmark. While some existing work exists in vision literature (see Literature Reference Nos. 5, 6, and 7), the system described herein is dramatically different than the prior art in that it does not explicitly model image/video similarity. Instead, the system analyzes the interactive relationship among users to identify the most "representative" images. Furthermore, the system summarizes the "temporal" highlights as an event progresses. This aspect has not been addressed in the traditional "landmark summarization" literature.

The process described herein can be implemented in a variety of systems and applied to a number of applications. For example, the process can be implemented in a system that provides for early investigation of social events. As yet another non-limiting example, the process can be applied to a system that summarizes the spread of opinions and sentiments for product marketing strategy. Further details regarding the process and corresponding system are provided below.

(4) SPECIFIC DETAILS OF VARIOUS EMBODIMENTS

Figure 3:
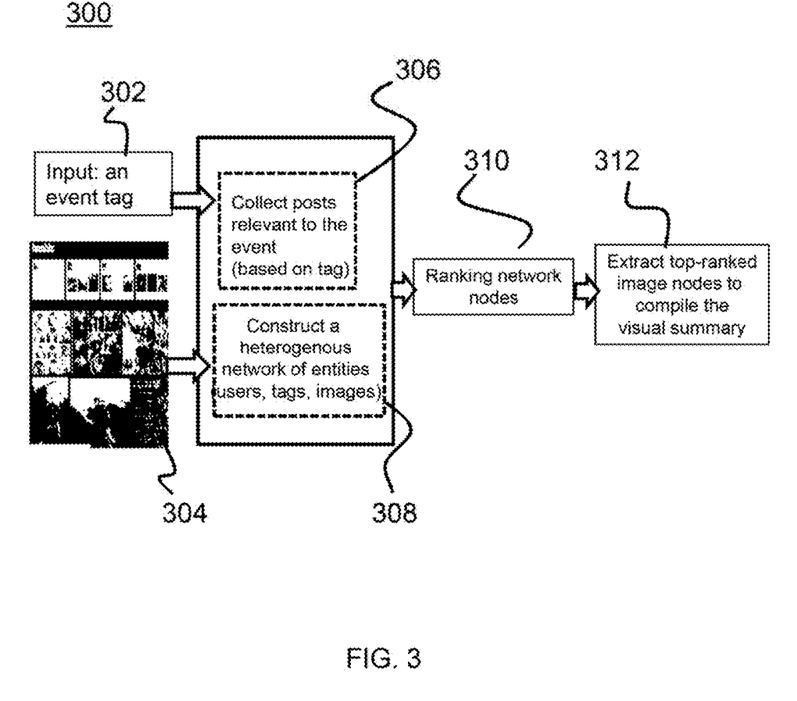
FIG. 3 is an illustration depicting a framework for event summarization.

As shown in FIG. 3, the real-world event summarization process 300 requires as an input a tag 302 representing an event. The input tag 302 is, for example, any textual tag that represents a real-world event. A non-limiting example of such in input tag 302 are the words "revolta do vinagre". The targeted events and their tags are detected using any suitable technique. Non-limiting examples of such techniques include those described by Hua et al. and Xu et al. in Literature Reference Nos. 8 and 9.

The system then collects 306 all (image) posts 304 available (e.g., on a microblogging site such as Tumblr®) that are associated to the tag 302. The system collects 306 the image posts 304 by, for example in one embodiment, scanning the Tumblr® corpus and extracting image posts which are annotated by the specific tag (e.g., "revolta do vinagre"). In one example implementation, the system constrains the image selection to a specific time period centered on the real-world event.

A graph-based model is used as the basis for the summarization process. To model relations between images captured around a particular event as well as the associated explicit and implicit metadata, a heterogeneous graph 308 is constructed that that includes types of nodes and edges.

Figure 4:
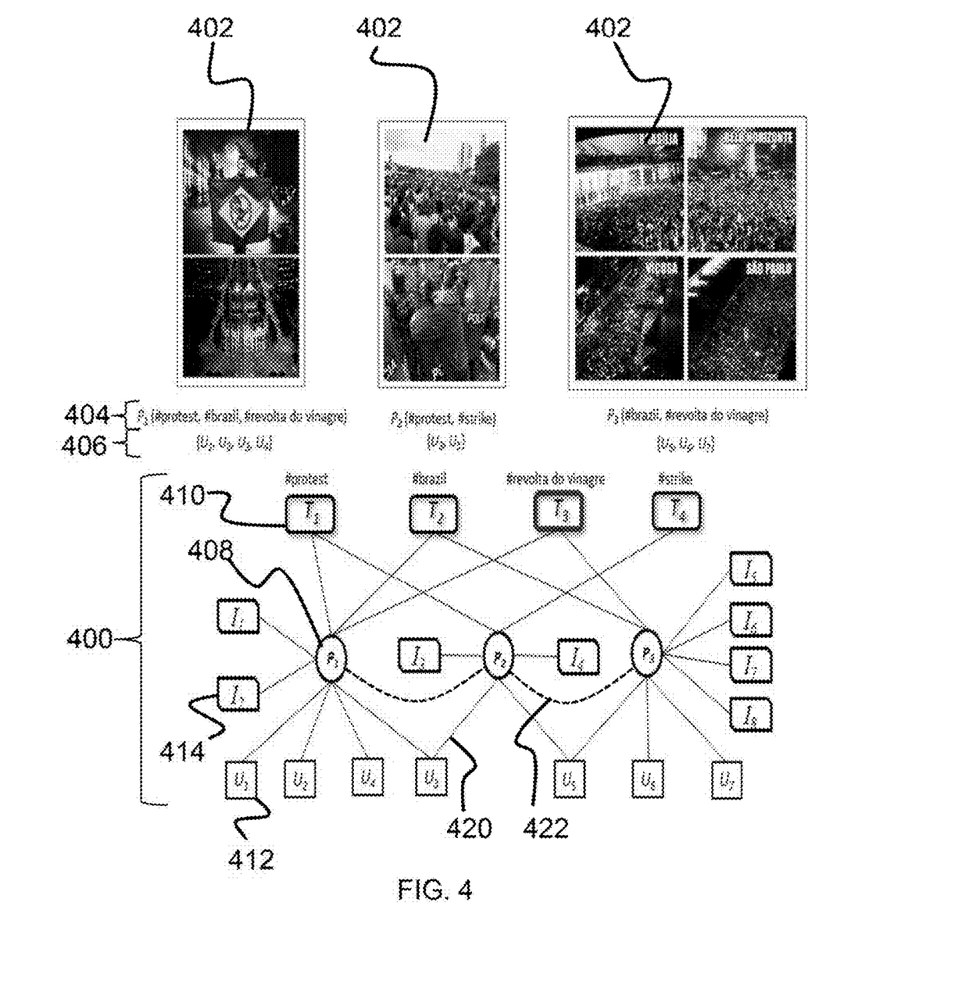
FIG. 4 is an illustration depicting an example of microblog posts and corresponding graphs as constructed based on the posts.

In some embodiments a graph is first constructed as follows. Let G=(V, E) be the undirected graph with the set of nodes V and the set of edges E. The nodes correspond to common object entities in a microblogging platform (e.g., Tumblr®), namely users, posts, tags, and images. As noted above, there are two types of edges in the graph, attribute links and temporal links, which signify the relationship among different object entities. The relationship among objects are modeled by the structure (graph 400) as shown in FIG. 4, which illustrates a graph 400 with different layers. In this non-limiting example, three sample posts 402 from a microblog (e.g., Tumbler®) were captured that are related to a major protest invent in Brazil. Hash tags 404 and associated users 406 are listed below each sample post 402. A graph 400 with heterogeneous node and edges are constructed based on the posts 402. Given an event tag (e.g., "revolta do vinagre"), graph-based ranking is conducted to identify the most representative images for summarization.

Note that nodes and edges can be appended to the graph incrementally as time progresses, and the graph can grow over time. For simplicity and in some embodiments, the system focuses on a portion of the time-evolving graph with a fixed time window centered around a targeted event. Also as noted above, the unified graph 400 is symmetric and includes the following set of nodes:

1. Post nodes 408 P=$p_1, p_2, \ldots, p_N$: For each N posts collected for a particular event, a post node 408 is introduced. In some embodiments, P consists of original posts only, and does not include reblogs.
2. Tag nodes 410 T=$t_1, t_2, \ldots, t_{N_t}$: A tag node 410 is added for each $N_t$ tags used within the collected Tumblr® posts.
3. User nodes 412 U=$u_1, u_2, \ldots, u_{N_u}$: A user node 412 is introduced for each $N_u$ users who has interacted with any posts collected for an event. In some embodiments, the interaction includes: uploads, reblogs and likes.
4. Image nodes 414 I=$i_1, i_2, \ldots, i_{N_i}$: An image node 414 is added for each image attached to any of the collected posts. An image node 414 may link to its parent post. In addition and in some embodiments, the system does not introduce additional links among images according to their visual similarities. The reason is that image similarity does not play a central role in event summarization, and unreliable links could introduce unnecessary bias and noise to the graph-based ranking algorithm. For instance, images could appear radically different from each other and yet still be very much related to a targeted event (see, for example, FIG. 4).

The final set of nodes V in the graph G is the union of the aforementioned nodes as:

$V = P \cup T \cup U \cup I$.

In some embodiments, there are two types of edges in the unified graph-based model as follows.

1. Attribute edges: Multiple social interactions and activities are captured through attribute edges added between posts and their surrounding attribute objects (i.e., users, tags, and images), including image-post edges, tag-post edges, and user-post edges. For instance, a user can reblog posts from others, a tag can be associated to multiple posts, and a post can be liked by many users. These attribute edges are marked with solid lines 420 as in FIG. 4. The attribute relationship between object entities is denoted with adjacency matrices $W_{PU}$, $W_{PT}$ and $W_{PI}$, which represent user-post edges, tag-post edges, and image-post edges, respectively. Uniform weight (e.g., 1) is used for all edges in these matrices.
2. Temporal edges: Edges are introduced among post nodes when they are published within a close temporal proximity. Formally, the adjacency matrix for posts is defined as:

$W_{PP}(i,j) = U(th_e - |\tau(i) - \tau(j)|)$, where U is a step function which returns 1 if its input is greater than zero, and return 0 otherwise. $\tau(i)$ and $\tau(j)$ correspond to the times at which two posts are published; $th_e$ is a constant threshold controlling the temporal proximity of two posts (fixed at 1800s in this work). These temporal edges are marked with dotted lines 422 as in FIG. 4

Subsequently, the unified graph in this aspect can then be represented with the adjacency matrix W with 0s everywhere, but except for the aforementioned submatrices as:

$$W = \begin{bmatrix} W_{PP} & W_{PT} & W_{PU} & W_{PI} \\ W_{TP} & & & \\ W_{UP} & & & \\ W_{IP} & & & \end{bmatrix}.$$

As noted above, the system can be employed to query for representative images. In doing so and as shown in FIG. 3, a ranking process 310 is performed. Given the constructed graph and a tag corresponding to an event, graph-based ranking is a natural choice to select the representative images for the targeted event. One example of a ranking process 310 is based on the random walk with restarts (RWR) over the heterogeneous graph (i.e., graph G) described above. RWR is a well-known concept in the field of information retrieval. One of its variant is the well-known Google PageRank algorithm. RWR has also been successfully used in image retrieval and tagging, as well as for collaborative recommendation.

Although any suitable ranking process 310 can be used, in this example, the well-known process of manifold ranking is used for the task. Essentially, the system computes a relevance score for each node with respect to the query tag node based on the intrinsic graph structure. Let $f \in R^{|V| \times 1}$ be the vector containing the final ranking scores of all graph nodes. The solution can be obtained with the following closed-form:

$$f = \left(1 + \frac{1}{\mu}L\right)^{-1} y,$$

where $$L = D^{-\frac{1}{2}}(D - W)D^{-1/2},$$

which is commonly known as the normalized graph Laplacian; D is a diagonal matrix whose (i,i)-entry equals to the sum of the i-th row of W; $\mu$ is a constant coefficient set to 0:1; $y \in R^{N \times 1}$ is a zero vector only with 1 at the node corresponding to the query tag. Subsequently by keeping only image nodes among $f$, the system generates a ranked list of candidate images for visual summarization.

Manifold ranking takes into account relevance and importance of the data, but it does not consider diversity. For example, if a node is very close to a high ranked node, it will share a similar high rank. However, diversity can be important as it is desirable to cover different aspects of an event. Specifically, it is desirable to obtain a diverse set of temporal highlights. To address this problem, the system employs a greedy algorithm which explicitly penalizes redundancies and promotes diversity (see the Diversification Algorithm below). The central idea of the diversification algorithm is to decrease the overall ranking scores of nodes which have information already conveyed by the more informative ones in nearby temporal proximity.

The Diversification Algorithm operates as follows:
Input: Set A={$x_i$|i=1, 2, . . . , $N_i$} containing the list of image nodes, and each element is associated with a score computed from the manifold ranking, i.e., Score ($x_i$)=$f_i^*$, i=1, 2, . . . , $N_i$.
Output: Set B containing the nodes with updated ranks, by performing the following:
1: Initialization B=Ø.
2: Sort the images in set A by their current overall ranking scores in descending order.
3: Identify the images with the highest ranked value, i.e., first element in the sorted list. Suppose image $x_i$ is the highest, first move it from set A to set B, and then a penalty is imposed to all other images whose parent posts are linked with the post of $x_i$. A Tumbler® post, for example, can contain a set of images, with the post being referred to as a "parent post" of such images. For each image $x_i$ that satisfy the criteria, its score is updated as follows: Score($x_j$)=Score($x_j$)−ωS'$_{ρ(i),ρ(j)}f_i^*$, where ρ(i) and ρ(j) are the corresponding posts of image i and j; ω is a constant penalty coefficient (fixed at 1 in this example); S'=$D_{PP}^{-1/2}$ is the normalized matrix of $W_{PP}$.
4: Repeat from step 2 again until A=Ø or a pre-defined iteration count has been reached.

Thus, using the system and method as described herein, the system increases diversity by decreasing the overall ranking scores of nodes which have information already conveyed by the more informative ones (i.e., images with a higher rank from a ranking algorithm) in nearby temporal proximity. After implementing the diversification algorithm, image nodes with the highest overall scores are then extracted 312 for visual summarization of the query event and are displayed or otherwise presented to a user.

(5) EXAMPLE EXPERIMENTAL RESULTS

Figure 5:
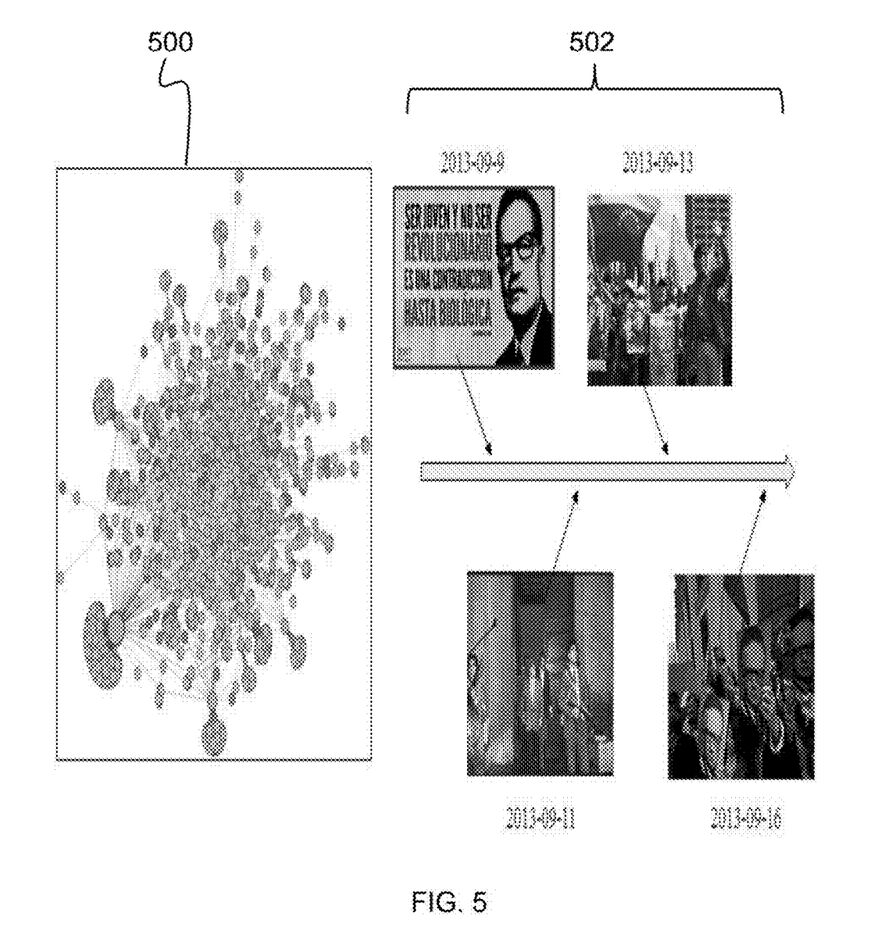
FIG. 5 is an illustration depicting an example network as constructed based on microblog posts regarding an event and corresponding images of temporal highlights of the event.
Figure 6:
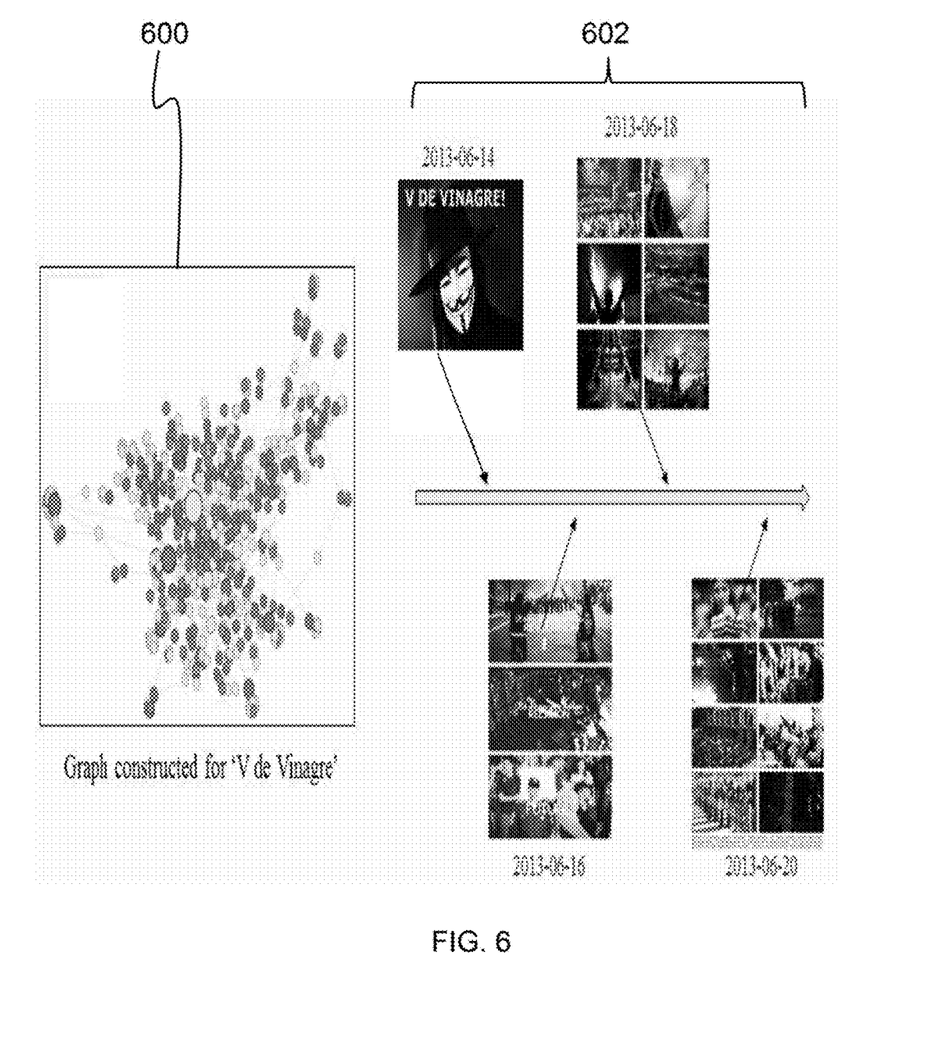
FIG. 6 is an illustration depicting another example network as constructed based on microblog posts regarding an event and corresponding images of temporal highlights of the event.

The system was demonstrated by showing the visual summarization of two real world events. The first event was on the 40$^{th}$ anniversary of the coup in Chile (with event tag "Salvador Allende"), and the second event was about the civil unrest movement in Brazil (with event tag "V de vinagre"). For each tag, the system searched and collected all microblog image (e.g., Tumblr®) posts centered on the peak event date within a 10-day window. Subsequently, a heterogeneous network was constructed based on the entities from the collected Tumblr®) posts. For each constructed network and referring to the process depicted in FIG. 3, RWR 310 was simulated with respect to the event tag, and each node was ranked accordingly. Top-ranked image nodes are then extracted 312 to compile the image summary or visualization. FIGS. 5 and 6 show the highest ranked (image) nodes on different days centered on the corresponding events. These image nodes are considered to be most representative and provide good visual summaries of the events as time progresses. More specifically, FIG. 5 depicts a network 500 that was constructed based on posts related to "Salvador Allende" and the corresponding temporal image highlights 502 (i.e., posts) of the event. The temporal image highlights 502 are based on being the top-ranked nodes and, for example, are depicted on a timeline with corresponding post dates. As another example, FIG. 6 depicts a network 600 that was constructed based on posts related to "V de vinagre" and the corresponding temporal image highlights 602 (i.e., posts) of the event.

What is claimed is:

1. A system for real world event summarization with microblog data, the system comprising:
one or more processors and a memory, the memory being a non-transitory computer-readable medium having executable instructions encoded thereon, such that upon execution of the instructions, the one or more processors perform operations of:
collecting microblog image posts related to a real world event based on an event tag;
identifying nodes and edges of a heterogeneous network based on the microblog image posts,
wherein the heterogenous network is a graph of different node types, the different node types comprising post nodes, tag nodes, user nodes, and image nodes, and wherein the heterogenous network comprises a plurality of unions of the different node types;
ranking the nodes; and
extracting images from top-ranked nodes for real world event summarization.

2. The system as set forth in claim 1, wherein in generating the heterogeneous network, the heterogeneous network is a graph G having post nodes P, tag nodes T, user nodes U, and image nodes I, such that a final set of nodes V in graph G is equal to P U T U U U I, where U denotes a union of different node types.

3. The system as set forth in claim 2, wherein the graph G is generated such that for each N microblog posts related to the event, a post node P is introduced, and wherein a tag node T is added for each Nt tags associated to microblog posts related to the real world event, and wherein a user node U is introduced for each Nu users uploading an image related to the real world event or commenting on another user's posts related to the real world event, and wherein an image node I is added for each of Ni images from the microblog posts related to the real world event.

4. The system as set forth in claim 1, wherein the extracted images are temporally presented to a user as the real world event summarization, with the extracted images depicted on a timeline.

5. The system as set forth in claim 1, wherein in generating the heterogeneous network, the heterogeneous network is a graph G having edges connecting the nodes, such that the graph G includes temporal edges and one or more types of attribute edges, the types of attribute edges including image-post edges, tag-post edges, and user-post edges.

6. The system as set forth in claim 1, wherein in ranking the nodes, the system employs manifold ranking to rank the nodes and generate a ranked list of candidate images for visual summarization.

7. The system as set forth in claim 1, wherein the one or more processors further perform an operation of diversification by decreasing rankings of one or more nodes to generate a set of nodes with updated ranks.

8. A computer program product for real world event summarization with microblog data, the computer program product comprising:
a non-transitory computer-readable medium having executable instructions encoded thereon, such that upon execution of the instructions by one or more processors, the one or more processors perform operations of:
collecting microblog image posts related to a real world event based on an event tag;
identifying nodes and edges of a heterogeneous network based on the microblog image posts, wherein the heterogenous network is a graph of different node types, the different node types comprising post nodes, tag nodes, user nodes, and image nodes, and wherein the heterogenous network comprises a plurality of unions of the different node types;

ranking the nodes; and extracting images from top-ranked nodes for real world event summarization.

9. The computer program product as set forth in claim 8, wherein in generating the heterogeneous network, the heterogeneous network is a graph G having post nodes P, tag nodes T, user nodes U, and image nodes I, such that a final set of nodes V in graph G is equal to P U T U U U I, where U denotes a union of different node types.

10. The computer program product as set forth in claim 9, wherein the graph G is generated such that for each N microblog posts related to the event, a post node P is introduced, and wherein a tag node T is added for each Nt tags associated to microblog posts related to the real world event, and wherein a user node U is introduced for each Nu users uploading an image related to the real world event or commenting on another user's posts related to the real world event, and wherein an image node I is added for each of Ni images from the microblog posts related to the real world event.

11. The computer program product as set forth in claim 8, wherein the extracted images are temporally presented to a user as the real world event summarization, with the extracted images depicted on a timeline.

12. The computer program product as set forth in claim 8, wherein in generating the heterogeneous network, the heterogeneous network is a graph G having edges connecting the nodes, such that the graph G includes temporal edges and one or more types of attribute edges, the types of attribute edges including image-post edges, tag-post edges, and user-post edges.

13. The computer program product as set forth in claim 8, wherein in ranking the nodes, the one or more processors employ manifold ranking to rank the nodes and generate a ranked list of candidate images for visual summarization.

14. The computer program product as set forth in claim 8, wherein the one or more processors further perform an operation of diversification by decreasing rankings of one or more nodes to generate a set of nodes with updated ranks.

15. A computer implemented method for real world event summarization with microblog data, the method comprising an act of:

causing one or more processors to execute instructions encoded on a non-transitory computer-readable medium, such that upon execution, the one or more processors perform operations of:

collecting microblog image posts related to a real world event based on an event tag;

identifying nodes and edges of a heterogeneous network based on the microblog image posts, wherein the heterogenous network is a graph of different node types, the different node types comprising post nodes, tag nodes, user nodes, and image nodes, and wherein the heterogenous network comprises a plurality of unions of the different node types;

ranking the nodes; and extracting images from top-ranked nodes for real world event summarization.

16. The method as set forth in claim 15, wherein in generating the heterogeneous network, the heterogeneous network is a graph G having post nodes P, tag nodes T, user nodes U, and image nodes I, such that a final set of nodes V in graph G is equal to P U T U U U I, where U denotes a union of different node types.

17. The method as set forth in claim 16, wherein the graph G is generated such that for each N microblog posts related to the event, a post node P is introduced, and wherein a tag node T is added for each Nt tags associated to microblog posts related to the real world event, and wherein a user node U is introduced for each Nu users uploading an image related to the real world event or commenting on another user's posts related to the real world event, and wherein an image node I is added for each of Ni images from the microblog posts related to the real world event.

18. The method as set forth in claim 15, wherein the extracted images are temporally presented to a user as the real world event summarization, with the extracted images depicted on a timeline.

19. The method as set forth in claim 15, wherein in generating the heterogeneous network, the heterogeneous network is a graph G having edges connecting the nodes, such that the graph G includes temporal edges and one or more types of attribute edges, the types of attribute edges including image-post edges, tag-post edges, and user-post edges.

20. The method as set forth in claim 15, wherein in ranking the nodes, the one or more processors employs manifold ranking to rank the nodes and generate a ranked list of candidate images for visual summarization.

21. The method as set forth in claim 15, wherein the one or more processors further perform an operation of diversification by decreasing rankings of one or more nodes to generate a set of nodes with updated ranks.

* * * * *